UNITED STATES PATENT OFFICE.

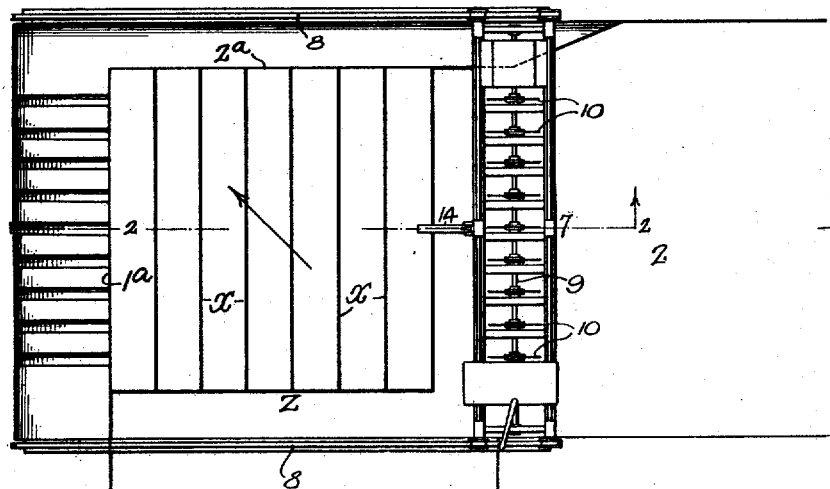

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

METHOD OF CUTTING BLOCKS OF ICE.

1,208,649.     Specification of Letters Patent.     Patented Dec. 12, 1916.

Application filed August 31, 1916. Serial No. 117,892.

*To all whom it may concern:*

Be it known that I, HOWELL D. PRATT, a citizen of the United States, residing in Philadelphia, Pennsylvania, have invented certain Improvements in Methods of Cutting Blocks of Ice, of which the following is a specification.

My invention relates to certain improvements in the process of cutting large cakes of ice into small blocks.

The object of my invention is to hold the large cake of ice while the saws are cutting the second cut, which is transverse to the primary cut. In practice, it has been found very difficult to hold the ice properly while the saws are making this final cut and they are liable to bind in the kerf or to break the corners of the blocks of ice, making imperfect blocks which have to be discarded.

My invention relates particularly to the method of cutting in which the frame carrying the circular saws is traversed over the block of ice while the block remains stationary.

This mechanism is fully set forth and claimed in another application for patent filed by me on the fifth day of October, 1915, under Serial No. 54,232.

In the accompanying drawing: Figure 1, is a plan view showing the channel and the location of the saws, also blocks of ice; Fig. 2, is a sectional view on the line 2—2, Fig. 1; Fig. 3, is a perspective view of a block of ice having longitudinal kerfs formed therein; and Fig. 4, is a perspective view of a block of ice having both the longitudinal kerfs and the transverse kerfs therein.

The apparatus is usually located at one side of a lake or river. The channel 1 has a right angled extension 2 formed in the bank of the river or formed by piles, or other suitable structure, extending into the lake or river. The channel is of a width to receive a large block or cake of ice $z$, which is to be cut into smaller blocks of a size adapted to be readily handled so that they can be conveniently packed in a storage house or in cars for delivery to distant points. Longitudinal kerfs $x$ are first cut in the blocks by saws and of a depth so as to leave a web at the base so that, at the proper time, the blocks can be broken apart. The transverse kerfs $y$ are spaced a given distance apart, as shown in Fig. 4, and are formed by a second set of saws which cut the ice to such a depth as to leave connecting webs and these can be broken so that the block delivered at the storage house will be substantially rectangular.

The saw frame 3 for making the longitudinal kerfs $x$ in the block is mounted on suitable rails 4 at the side of the channel 1, and mounted on this saw frame is a spindle 5 having a series of circular saws 6, in the present instance spaced a given distance apart. Suitable mechanism is used to drive the saws and to traverse the frame on the rails. This apparatus is completely set forth in the pending application above alluded to.

The block of ice is held in any suitable manner in the channel while the saw frame is being traversed over the block. In the present instance, at one side of the channel is a fixed guide 11 and at the opposite side is a yielding guide 12 having flexible arms 13, preferably of wood with iron tips, for engaging the ice so that while the block of ice is free to move forward it cannot move back as the saws are cutting, due to the iron tips on the arms 13. In some instances the saw frame may be stationary and the block of ice may be fed under the saw frame, making the initial longitudinal kerfs.

7 is the second saw frame mounted on rails 8 at right angles to the rails 4 and on this saw frame is a spindle 9 having circular saws 10 spaced a given distance apart to cut the transverse kerfs $y$ in the block of ice. One rail 8 spans the channel 1, while the other rail 8 is located at the edge of the channel, as shown in Fig. 1. Suitable means are provided for traversing the saw frame 7 on the rails 8.

The block of ice $z$ is forced into the corner formed at the junction of the channel 1 and the channel 2, the block bearing against the walls 1$^a$ and 2$^a$, or against fixed fenders secured to these walls. The block can be held by one or more operators using hooks and bearing in the direction of the arrow, Fig. 1, so as to force the block into the corner. This holds the block rigidly while the saw is making the transverse kerfs in the block, the saws making a clean cut without the liability of the fragile corners of the blocks of ice being broken. After the cut has been made the blocks can be moved out of the corner and through the channel and the small blocks can be severed on the lines of the kerfs and transferred in the ordinary manner to a storage house. The saw frame 7 can be returned to its original position or can remain at the wall 1ª of the channel while the block z is being moved out of the corner and through the channel 2, after which it can be returned to its original position.

On each saw frame are handled hooks 14, which engage the block of ice after the saws have made the cut so that, as the saw frame returns, the block of ice is carried with it, thus avoiding the necessity of pushing the ice to the next cutter by hand.

I claim:—

The process herein described of cutting a block of ice, said process consisting in floating the ice into the corner of a right angled channel formed at the junction of two sections of the channel, holding the ice rigidly in said corner, then traversing the cutting mechanism over the cakes of ice so as to form a series of kerfs therein, and finally removing the cut block of ice from the corner.

HOWELL D. PRATT.

Copies of this patent may be obtained for five cents each, by addressing the "Commissioner of Patents, Washington, D. C."